United States Patent
Panah et al.

(10) Patent No.: US 11,975,976 B2
(45) Date of Patent: May 7, 2024

(54) PROCESS FOR PURIFYING SILICON COMPOUNDS

(71) Applicant: Dow Silicones Corporation, Midland, MI (US)

(72) Inventors: Reza Hagh Panah, Midland, MI (US); Michael Depierro, Midland, MI (US); Barry Ketola, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 342 days.

(21) Appl. No.: 17/617,032

(22) PCT Filed: Aug. 10, 2020

(86) PCT No.: PCT/US2020/045560
§ 371 (c)(1),
(2) Date: Dec. 7, 2021

(87) PCT Pub. No.: WO2021/034526
PCT Pub. Date: Feb. 25, 2021

(65) Prior Publication Data
US 2022/0234902 A1    Jul. 28, 2022

Related U.S. Application Data

(60) Provisional application No. 62/890,088, filed on Aug. 22, 2019.

(51) Int. Cl.
*C01B 33/107* (2006.01)
*C07F 7/12* (2006.01)

(52) U.S. Cl.
CPC ........ *C01B 33/10794* (2013.01); *C07F 7/127* (2013.01)

(58) Field of Classification Search
CPC .... C01B 33/10794; C07F 7/0896; C07F 7/12; C07F 7/127
See application file for complete search history.

(56) References Cited

U.S. PATENT DOCUMENTS

| | | |
|---|---|---|
| 5,292,909 A | 3/1994 | Chadwick et al. |
| 5,292,912 A | 3/1994 | Chadwick et al. |
| 5,321,147 A | 6/1994 | Chadwick et al. |
| 5,326,896 A | 7/1994 | Chadwick et al. |
| 5,430,168 A | 7/1995 | Ferguson et al. |
| 5,502,230 A | 3/1996 | Mautner et al. |
| 5,545,743 A | 8/1996 | Cannady et al. |
| 5,606,090 A | 2/1997 | Brinson et al. |
| 5,616,760 A | 4/1997 | Bank et al. |
| 5,627,298 A | 5/1997 | Freeburne et al. |
| 5,629,438 A | 5/1997 | Freeburne et al. |
| 5,877,337 A | 3/1999 | Mautner et al. |
| 5,907,050 A | 5/1999 | Crum et al. |
| 5,922,893 A | 7/1999 | Tsukuno et al. |
| 5,922,894 A | 7/1999 | Crum et al. |
| 6,013,235 A | 1/2000 | Brinson et al. |
| 6,013,824 A | 1/2000 | Wood |
| 6,090,360 A | 7/2000 | Herman |
| 6,344,578 B1 | 2/2002 | Mautner et al. |
| 7,655,812 B2 | 2/2010 | Toma et al. |
| 8,476,468 B2 * | 7/2013 | Rauleder .......... C07F 7/20 556/466 |
| 8,637,695 B2 | 1/2014 | Lewis et al. |
| 8,680,312 B2 | 3/2014 | Tamme et al. |
| 8,697,901 B2 | 4/2014 | Lewis et al. |
| 8,852,545 B2 | 10/2014 | Brinson et al. |
| 2005/0113592 A1 | 5/2005 | Wagner et al. |
| 2010/0266489 A1 | 10/2010 | Rauleder et al. |
| 2010/0274028 A1 | 10/2010 | Mueh et al. |

FOREIGN PATENT DOCUMENTS

| | | | |
|---|---|---|---|
| CN | 100999530 A | 7/2007 | |
| CN | 101824047 A | 9/2010 | |
| DE | 102007048937 A1 | 4/2009 | |
| DE | 102007050199 A1 | 4/2009 | |
| EP | 1705180 B1 | 9/2011 | |
| EP | 2454194 A1 | 5/2012 | |
| JP | 3823400 B2 * | 9/2006 | ......... C07F 7/04 |
| JP | 2014227322 A | 12/2014 | |
| WO | 2021034526 A1 | 2/2021 | |

OTHER PUBLICATIONS

Toagosei (JP 3823400B2, machine translation Mar. 18, 2024).*
"Acid Washed Powdered Activated Carbon", PWA, 2013, p. 1213.
"Acid Washed Granular Activated Carbon", CPG LF 12×40, 2015.
Barakat, "New trends in removing heavy metals from industrial wastewater", Arabian Journal of Chemistry, 2011, pp. 361-377.
Lalhmunsiama, "Manganese oxide immobilized activated carbons in the remediation of aqueous wastes contaminated with copper(II) and lead(II)", Chemical Engineering Journal 225, 2013, pp. 128-137.
Lima, "Hardwood-based Granular Activated Carbon for metals remediation", American Water Works Association, 2004, vol. 96, No. 7, pp. 95-102.
Perrich, "Activated Carbon Adsorption For Wastewater Treatment", CRC Press, 1981, pp. 18-19.
Wilson, "Select metal adsorption by activated carbon made from peanut shells", Bioresource Technology 97, 2006, pp. 2266-2270.

* cited by examiner

*Primary Examiner* — Pancham Bakshi
(74) *Attorney, Agent, or Firm* — Catherine U. Brown

(57) ABSTRACT

A process for removing metallic impurities from halogenated silicon compounds, such as chlorosilane monomers and/or chlorinated polysilanes is disclosed. The process involves treating a halogenated silicon compound with a tertiary amine and thereafter a suitable grade of activated carbon.

13 Claims, No Drawings

PROCESS FOR PURIFYING SILICON COMPOUNDS

CROSS REFERENCE TO RELATED APPLICATIONS

This application is a U.S. national stage filing under 35 U.S.C. § 371 of PCT Application No. PCT/US2020/045560 filed on 10 Aug. 2020, currently pending, which claims the benefit of U.S. Provisional Patent Application No. 62/890088 filed 22 Aug. 2019 under 35 U.S.C. § 119 (e). PCT Application No. PCT/US2020/045560 and U.S. Provisional Patent Application No. 62/890088 is hereby incorporated by reference.

TECHNICAL FIELD

A process for removing metal impurities from fluid silicon compounds, such as direct process residue (DPR) is disclosed. The process can be used to remove high amounts of aluminum and titanium impurities from DPR.

BACKGROUND

The direct process for making halosilane monomers, such as chlorosilane monomers, is performed on a commercial scale by reacting metallurgical grade silicon metal particles with a halide (e.g., a chloride) in a fluidized bed reactor (FBR). The halide may be an organic halide such as methyl chloride, wherein the direct process will produce organo-functional chlorosilanes, such as dimethyldichlorosilane. Alternatively, the halide may be a hydrogen halide (e.g., HCl), wherein the direct process will be used to produce inorganic halosilanes, such as trichlorosilane. Catalysts and/or promoters may optionally be added to the FBR to improve yield and/or selectivity to desired halosilane monomers.

At the end of a direct process campaign, the DPR must be disposed of. DPR typically contains unreacted silicon metal, metal impurities, halosilane monomers, and high boiling components. It is desirable to recycle and/or reuse the halosilane monomers and high boiling components of DPR. The high boiling components may include compounds containing Si—Si, Si—O—Si, Si—C—Si, Si—C—C—Si, and Si—C—C—C—Si linkages in the molecules. Typical compounds in a high boiling component of DPR are described, for example, in U.S. Pat. Nos. 2,598,435, 2,681,355, and 8,852,545. Recovery of halosilane monomers from DPR, and conversion of the compounds in the high boiling component of DPR to halosilane monomers, are desirable to minimize waste from the direct process.

Metal impurities, which may be introduced in the FBR from the silicon metal and/or catalysts and promoters can accumulate in the reactor during the campaign, can be detrimental to reactivity of the halosilane and high boiling components recovered from DPR. Without wishing to be bound by theory, it is thought that the metal impurities may act as catalyst poisons for cracking the high boiling components and/or for further reaction of the halosilane components to form useful products such as polyorganosiloxane polymers or resins. Therefore, it is desirable to minimize or eliminate metal impurities from halosilane monomers and high boiling components of DPR.

Activated carbon has been used to remove metal impurities from silicon compounds in the past. However, previous methods using activated carbon removed certain metal impurities to low levels only when starting with silicon compounds already containing low levels of the impurities.

SUMMARY

A process for purifying a fluid silicon compound comprises:
1) combining
   A) a mixture comprising
      i) a fluid silicon compound and
      ii) an impurity comprising a metal, where the impurity is present in an amount sufficient to provide at least 500 ppm of the metal based on weight of the mixture, and
   B) a tertiary amine;
   thereby forming C) a product comprising i) the fluid silicon compound and iii) an amine-metal complex; and
2) combining
   C) the product formed in step 1), and
   D) an activated carbon; thereby adsorbing the amine-metal complex with the activated carbon and preparing a purified fluid silicon compound.

DETAILED DESCRIPTION

Mixture

The mixture used in step 1) of the method described herein comprises i) a fluid silicon compound and ii) an impurity comprising a metal. The mixture may comprise DPR. Alternatively, the mixture may comprise i) halosilane monomer as the fluid silicon component in addition to ii) the impurity. When the mixture comprises DPR, the DPR may be derived from the direct process for making methylchlorosilanes (MCS DPR). Alternatively, the DPR may be derived from the direct process for making trichlorosilane (TCS DPR). Alternatively, the DPR may be a mixture of MCS DPR and TCS DPR. U.S. Pat. No. 8,852,545 describes the content of MCS DPR and TCS DPR and is hereby incorporated by reference for that purpose.

MCS DPR

Alternatively, the mixture used in step 1) of the process described above may be MCS DPR. MCS DPR typically comprises a monosilane of formula $(CH_3)_c SiCl_{(4-c)}$ where subscript c is 0 to 4, alternatively 1 to 3 and a polysilane of formula

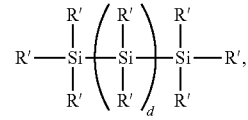

where each R' is independently selected from H, methyl, and Cl, and subscript d is 0 to 6, with the proviso that at least 2, alternatively at least 3, alternatively 2 to 6, and alternatively 3 to 6, instances of R' per molecule are Cl. The monosilane may be selected from the group consisting of methyltrichlorosilane, dimethyldichlorosilane, trimethylchlorosilane, and a combination of two or more thereof. The polysilane may be selected from the group consisting of hexachlorodisilane, octachlorotrisilane, decachlorotetrasilane, and higher homologous chlorinated polysilanes; tetramethyldichlorodisilane, trimethyltrichlorodisilane, tetramethyltetrachlorotrisilane, dimethyltetrachlorodisilane, pentachlorohydrodisilane, tetrachlorodihydrodisilane, pentachloromethyldisilane, trimethyltrichlorodihydrotrisilane, tetramethyldichlorodihydrotrisilane, and other chlorinated methyl-functional polysilanes; and combinations of two or more thereof.

TCS DPR

Alternatively, the mixture used in step 1) of the process described above may be TCS DPR. TCS DPR typically comprises a monosilane of formula $H_aSiCl_{(4-a)}$ where subscript a is 0 to 4, and a polysilane of formula

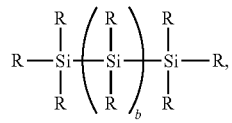

where each R is independently selected from H and Cl, and subscript b is 0 to 6, with the proviso that at least 2 instances of R per molecule are Cl, alternatively at least 3, alternatively 2 to 6, and alternatively 3 to 6, instances of R per molecule are Cl. The monosilane in TCS DPR typically comprises trichlorosilane ($HSiCl_3$), dichlorosilane ($H_2SiCl_2$), and monochlorosilane ($H_3SiCl$). The polysilane in TCS DPR may be selected from the group consisting of hexachlorodisilane, octachlorotrisilane, decachlorotetrasilane, and higher homologous chlorinated polysilanes; dihydrotetrachlorodisilane, pentachlorohydrodisilane, tetrachlorodihydrodisilane, trichlorotrihydrodisilane, tetrahydrotetrachlorotrisilane, trihydropentachlorotrisilane, and other chlorinated hydro-functional polysilanes; and combinations of two or more thereof.

Other Halosilane Monomer Mixtures

Alternatively, the fluid silicon compound in the mixture used in step 1) of the process described herein may be one halosilane monomer, or a mixture of two or more halosilane monomers of formula, where the halosilane monomer has formula $R'''_xH_ySiX_z$, where each $R'''$ is an independently selected monovalent hydrocarbon group, each X is an independently selected halogen atom, and the subscripts have values such that $0 \le x \le 3$, $0 \le y \le 3$, $1 \le z \le 4$, and a quantity $(x+y+z)=4$. The monovalent hydrocarbon group for $R'''$ may be an alkyl group, an alkenyl group, or an aryl group. Exemplary alkyl groups include methyl, ethyl, propyl (including n-propyl and iso-propyl), and butyl (including n-butyl, iso-butyl, sec-butyl, and tert-butyl); alternatively the alkyl group may be methyl or ethyl; and alternatively methyl. Suitable alkenyl groups include vinyl, allyl, and hexenyl. Alternatively, the alkenyl group may be vinyl or hexenyl; alternatively vinyl. Suitable aryl groups include phenyl. Each X may be independently selected from the group consisting of bromine (Br), chlorine (Cl), fluorine (F), and iodine (I); alternatively Br, Cl, and F; alternatively Br and Cl; and alternatively each X may be Cl. Alternatively, the fluid silicon compound may comprise a halosilane monomer of formula $(CH_3)_cSiCl_{(4-c)}$ where subscript c is 1 to 3.

Examples of halosilane monomers include, but are not limited to, tetrachlorosilane ($SiCl_4$), trichlorosilane ($HSiCl_3$), methyltrichlorosilane ($CH_3SiCl_3$), dimethyldichlorosilane [$(CH_3)_2SiCl_2$], dichlorosilane ($H_2SiCl_2$), monochlorosilane ($H_3SiCl$), phenylmethyldichlorosilane [$(C_6H_5)(CH_3)SiCl_2$], phenyltrichlorosilane [$(C_6H_5)SiCl_3$], vinyl trichlorosilane [$(CH_2\!\!=\!\!CH)SiCl_3$], or a combination of two or more thereof.

Metallic Impurities

The mixture used in step 1) of the process described herein comprises an impurity. The impurity comprises a metal (other than silicon), a compound of the metal, or a combination thereof. For example, the impurity may comprise aluminum, titanium, a compound of aluminum, a compound of titanium, or a combination of any two or more thereof. Examples of aluminum compounds include aluminum chloride ($AlCl_3$). Examples of titanium compounds include $TiCl_2$, $TiCl_3$, $TiCl_4$ and two or more thereof. The mixture contains a high amount of the impurity, i.e., an amount of the impurity sufficient such that the mixture in step 1) contains at least 500 ppm, alternatively >1,000 ppm, alternatively 500 ppm to 4,000 ppm, alternatively >1,000 ppm to 4,000 ppm; of the metal (other than silicon). Alternatively, the mixture may contain at least 700 ppm by weight of aluminum and at least one other metal and at least one other metal, such that total metal content is >1,000 ppm. Alternatively, the mixture may contain at least 900 ppm by weight of titanium and at least one other metal, such that total metal content is >1,000 ppm.

Tertiary Amine

In step 1) of the process described above, B) the tertiary amine may be a tertiary amine that is a liquid at ambient conditions (i.e., RT and ambient pressure). For example, the tertiary amine may be selected from the group consisting of those shown below in Table A.

TABLE A

Examples of Tertiary Amines

| Product Name | Chemical Name | Appearance | Typical carbon chain composition |
|---|---|---|---|
| FARMIN DM24C | Dimethyl coconut amine | Liquid | $C_{12}$: 49%, $C_{14}$: 20%, $C_{16}$: 11%, $C_{18}$: 10% |
| FARMIN DM2098 | Lauryl dimethylamine | Liquid | $C_{12}$: 98% |
| FARMIN DM4098 | Tetradecyl dimethylamine | Liquid | $C_{12}$: 2%, $C_{14}$: 97% |
| FARMIN DM4250M | Alkyl dimethylamine | Liquid | $C_{12}$: 41%, $C_{14}$: 50%, $C_{16}$: 9% |
| FARMIN DM6098 | Hexadecyl dimethylamine | Liquid | $C_{16}$: 98% |
| FARMIN M2-1095 | N-methyl didecylamine | Liquid | $C_{10}$: 98% |
| FARMIN DM0898 | Octyl dimethylamine | Liquid | $C_8$: 98% |
| FARMIN DM2465 | Alkyl (C12-16) methylamines | Liquid | $C_{12}$: 65%, $C_{14}$: 33% |
| FARMIN DM2467 | Alkyl (C12-16) dimethylamines | Liquid | $C_{12}$: 67%, $C_{14}$: 25%, $C_{16}$: 7% |
| FARMIN DM2470N | Alkyl (C12-16) dimethylamines | Liquid | $C_{12}$: 70%, $C_{14}$: 25%, $C_{16}$: 5% |

TABLE A-continued

Examples of Tertiary Amines

| Product Name | Chemical Name | Appearance | Typical carbon chain composition |
|---|---|---|---|
| FARMIN DM8098 | Octadecyl dimethylamine | Liquid | $C_{18}$: 98% |
| FARMIN DM8665 | Alkyl (C14-18) methylamines | Liquid | $C_{14}$: 4%, $C_{16}$: 31%, $C_{18}$: 64% |
| FARMIN M2-8150 | Decylmethyloctylamine | Liquid | $C_{8-10}$: 98% |

The tertiary amines in Table 1 are commercially available from Kao Specialties Americas LLC of High Point, NC, USA.

Alternatively, the tertiary amine may be a trialkyl amine. The trialkyl amine may have formula $NR''_3$, where each R" is an independently selected alkyl group of 2 to 16 carbon atoms, alternatively 2 to 12 carbon atoms, alternatively 2 to 8 carbon atoms, and alternatively 2 to 4 carbon atoms. Alternatively, the trialkyl amine may be triethylamine. Tertiary amines are known in the art and are commercially available, e.g., from Millipore Sigma of St. Louis, Missouri, USA.

Activated Carbon

The activated carbon used in the method herein is not specifically restricted. However, the activated carbon may be bituminous coal based or lignite based. Suitable activated carbons are disclosed in Reference—Activated Carbon Adsorption For Wastewater Treatment, Jerry. R. Perrich, CRC Press, 1981. The activated carbons made from lignite tend to have a large pore diameter with a higher total pore volume (higher molasses number) that makes better suited for the removal large molecular weight components from chemical compounds in liquid phase. However, the bituminous coal based activated carbon has highly developed porous structure and large specific surface, large micropore volume suited for adsorption of smaller molecules. In other words, Lignite carbon has the larger pore volume, smaller surface area compared to bituminous-based activated carbon. Examples of activated carbons may have the properties shown in Table B.

TABLE B

Typical Properties of 8 × 30 Mesh Carbons

| | Lignite carbon | Bituminous coal carbon |
|---|---|---|
| Total surface area, $m^2/g$ | 600-650 | 950-1050 |
| Iodine number, min | 600 | 950 |
| Bulk density, $lb/ft^3$ backwashed and drained | 22 | 26 |
| Particle density wetted in water, $g/cm^3$ | 1.3-1.4 | 1.3-1.4 |
| Pore volume, $cm^3/g$ | 1.0 | 0.85 |
| Effective size, mm | 0.75-0.90 | 0.8-0.9 |
| Uniformity coefficient | 1.9 or less | 1.9 or less |
| Mean particle dia., mm | 1.5 | 1.6 |
| Pittsburgh abrasion number | 50-60 | 70-80 |
| Moisture as packed, max | 9% | 2% |
| Molasses RE (relative efficiency | 100-120 | 40-60 |
| Ash | 12-18% | 5-8% |
| Mean-pore radius | 33 A | 14 A |

Alternatively, the activated carbon may be bituminous coal based. Without wishing to be bound by theory, it is thought that bituminous coal based activated carbon may perform better in the process described herein than other types of activated carbon. Bituminous coal based activated carbon may be selected from the group consisting of CPG™ LF and PWA grades available from Calgon Carbon Corporation of Pittsburgh, Pa., USA. Examples of suitable lignite based activated carbons include Darco™ Li from Cabot Corporation of Boston, Mass., USA.

Method Steps

The process for purifying the fluid silicon compound may comprise:
1) combining
    99.5 weight % to 99.75 weight % of the mixture comprising
      i) the fluid silicon compound and
      ii) the impurity comprising a metal, where the impurity is present in an amount sufficient to provide at least 500 ppm of the metal based on weight of the mixture, and
    0.25 weight % to 0.5 weight % of the tertiary amine; thereby forming a product comprising i) the fluid silicon compound and iii) the amine-metal complex; and
2) combining
    92% to 98% of the product formed in step 1), and
    2% to 8% of an activated carbon; thereby adsorbing the amine-metal complex with the activated carbon and preparing a purified fluid silicon compound.

The process may optionally further comprise one or more additional steps. For example, if the mixture contains a particulate (such as DPR containing silicon metal), the particulate may be removed before step 1) and/or after step 1) and before step 2). The particulate may be removed by any convenient means, such as sedimentation and removal of the supernatant fluid, filtration, centrifugation, or a combination thereof.

If the mixture contains a relatively volatile component, all or a portion of the volatile component may be removed before step 1). For example, DPR may be stripped and/or distilled before step 1) to remove volatile components such as unreacted halide, and lower boiling halosilanes such as dichlorosilane and/or methylhydrogendichlorosilane.

Step 1) may be performed by any convenient means, such as mixing in a vessel with an agitator. Step 1) may be performed under inert and anhydrous conditions. Pressure in step 1) is not critical and may be ambient or higher pressure. Step 1) may be performed at a temperature of −30° C. to 300° C.

The process may optionally further comprise drying the activated carbon before mixing the product formed in step 1) and the activated carbon in step 2). Drying may be performed by any convenient means such as heating and/or sweeping a dry inert gas through a packed bed of the activated carbon.

Step 2) of the process described above may be performed by any convenient means, such as mixing the product formed in step 1) and the activated carbon in any apparatus suitable for combining fluids and solids, such as a batch vessel optionally with an agitator. Step 2) may be performed at ambient pressure or higher. Step 2) may be performed at a temperature of −30° C. to 300° C. Alternatively, step 2) may be performed at ambient temperature and pressure.

The process described herein may be performed in a batch, semi-batch or continuous mode.

The process may optionally further comprise: 3) recovering the purified silicon compound after step 2). For example, particulate, such as residual activated carbon may be present with the purified silicon compound after step 2). The particulate may be removed by any convenient means, such as sedimentation and removal of the supernatant fluid, filtration, centrifugation, or a combination thereof.

The process may optionally further comprise: 4) removing all or a portion of residual tertiary amine, for example, to minimize or eliminate residual tertiary amine and/or to achieve a desired concentration of tertiary amine in the purified silicon compound. The amine may be removed from the purified silicon compound using any convenient means. This could include, for example distillation, thin film evaporation, wiped film evaporation, adsorption (with carbon or other adsorbent).

The process described above may provide the benefit that the purified fluid silicon compound contains ≤50 ppm of metals from impurities. The purified silicon compound may contain ≤50 ppm Al, alternatively ≤50 ppm Ti, alternatively ≤50 ppm of Al and Ti combined. Alternatively, the purified fluid silicon compound may contain <10 ppm Ti, <10 ppm Al, or both.

EXAMPLES

These examples are intended to illustrate the invention to one skilled in the art and are not to be interpreted as limiting the scope of the invention set forth in the claims.

Reference Example 1—Drying Activated Carbon

Activated carbon samples as received from vendors contained varying concentrations of moisture. To mitigate risk of water reacting with chlorosilane starting materials and forming HCl vapor and siloxane gels, all activate carbon samples were consistently dried at 160° C. in a vacuum oven for 24 hours before use. Once dried, the activated carbon samples were removed from the oven and placed into jars. The jars were then stored in a glove box which was maintained at very low moisture levels.

Example 2—General Procedure

TCS DPR was stripped and then treated with CPG-LF 12×40 activated carbon (bituminous coal-based activated carbon from Calgon Carbon Corporation of Pittsburgh, Pa., USA) and Darco Li 12×20 (Lignite-based activated carbon from Cabot Corporation), both of which had been dried as described in Reference Example 1. Two different levels of solid (activated carbon) to liquid mass (direct process residue) ratios, i.e., 8% and 13% were used. The activated carbon was weighed and added to a glass vial inside the glove box. Then the DPR was added to the vial.

Once the DPR addition was complete, the vial was removed from the glove box. A strip of parafilm was wrapped around the cap of the vial to mitigate material leaking out the top. The vials were then placed on a vortex mixer inside a hood and allowed to shake for 24 hours.

After 24 hours, the shaken vials were placed back inside the glove box. A syringe and filter were used to strain the contents of the vials. A 5 mL syringe with a thread on 0.45-micron filter was used. The effluent from the filter was a clear liquid free of debris. The filtered material was analyzed by ICP-OES according to the test method in Reference Example 4, below. The resulting metal contents in ppm are shown below in Tables 1 and 2.

TABLE 1

Comparative Examples with No Treatment and with Bituminous Coal Based Activated Carbon and No Tertiary Amine

| Component | Comparative Control 1: Stripped TCS DPR (Starting feed) | Comparative Example 2: CPG-LF (bituminous) (8% Carbon to DPR) | Comparative Example 3: CPG-LF (bituminous) (13% Carbon to DPR) |
|---|---|---|---|
| Al | 785 | 108 | 50 |
| Ti | 1208 | 105 | 7 |

TABLE 2

Comparative Examples with No Treatment and with Lignite Based Activated Carbon and No Tertiary Amine

| Component | Comparative Control 1: Stripped TCS DPR (Starting feed) | Comparative Example 4: Darco (Lignite) (8% Carbon to DPR) | Comparative Example 5: Darco (Lignite) (13% Carbon to DPR) |
|---|---|---|---|
| Al | 785 | 63 | 12 |
| Ti | 1208 | 855 | 474 |

Tables 1 and 2 showed that when TCS DPR was treated with carbon only (no tertiary amine), 50 ppm or less of impurities containing Al and Ti could not be achieved unless an uneconomically high amount of activated carbon was used. Furthermore, the result was not consistent in that certain activated carbon (e.g., Darco) could not achieve 50 ppm or less of Ti impurities even at high levels.

Example 3 General Procedure

TCS DPR stripped as described in Reference Example 1 was treated with triethylamine (TEA). TEA was first added to the TCS DPR (0.5% TEA/99.5% TCS DPR, see Table 3; or 0.25% TEA/99.75% TCS DPR, see Table 4), and the resulting TEA-treated DPR was evaluated by ICP (see comparative examples 6 and 9 in Tables 3, and 4 below).

The resulting TEA-treated DPR was then used as a master batch for carbon adsorption treatment using activated carbon to TCS DPR mass ratios shown in Tables 3 and 4. The activated carbon was weighed and added to a glass vial inside the glove box. Then the TCS DPR was added to the vial.

Once the TCS DPR addition was complete, the vial was removed from the glove box. A strip of parafilm was wrapped around the cap of the vial to mitigate material leaking out the top. The vials were then placed on a vortex mixer inside a hood and allowed to shake for 24 hours.

After 24 hours, the shaken vials were placed back inside the glove box. A syringe and filter were used to strain the contents of the vials. A 5 mL syringe with a thread on 0.45-micron filter was used. The effluent from the filter was a clear liquid free of debris. The filtered material was analyzed by ICP-OES according to the method of Reference Example 4. The resulting metals contents in ppm are shown below in Tables 3 and 4.

TABLE 3

Comparison of treatment with TEA and Process of This Invention with both TEA and Activated Carbon

| Component | Comparative Control 1 - Stripped TCS DPR (Starting feed) | Comparative Example 6: 0.5% TEA treatment, no carbon | Working Example 7: 0.5% TEA with 2% CPG-LF loading (bituminous) | Working Example 8: 0.5% TEA with 4% CPG-LF loading (bituminous) |
|---|---|---|---|---|
| Al | 785 | 64 | ND | ND |
| Ti | 1208 | 337 | ND | 2 |

Table 3 showed that treating TCS DPR with only the TEA did not reduce Al and Ti impurity content to less than 50 ppm. However, the Working Examples showed that practicing the process of this invention with TEA and bituminous coal based activated carbon reduced both Ti and Al containing impurities to less than 10 ppm.

TABLE 4

Comparison of treatment with Triethyl Amine (TEA) and Process of This Invention

| Component | Comparative Control 1 - Stripped TCS DPR (Starting feed) | Comparative Example 9: 0.25% TEA treatment, no activated carbon | Working Example 10: 0.25% TEA with 2% CPG-LF loading (bituminous) | Working Example 11: 0.25% TEA with 4% CPG-LF loading (bituminous) |
|---|---|---|---|---|
| Al | 785 | 43 | ND | ND |
| Ti | 1208 | 726 | 62 | 3 |

Table 4 showed that treating TCS DPR with a lower level of TEA (than used above in Table 3) and thereafter with a bituminous coal based activated carbon was effective to remove one or both of Ti and Al impurities to less than 10 ppm.

Reference Example 4 ICP-OES Test Method

A sample (5 grams) was weighed into a platinum dish, HF was added immediately to the sample to digest all silicon. $H_2SO_4$ and $HNO_3$ were added to complete the digestion and then taken to excipient dryness. $HNO_3$ and $H_2O_2$ were added, taken to excipient dryness then brought to a final volume of 25 ml using warm 5% $HNO_3$. The samples were then analyzed via ICP-OES with a Sc internal standard added online as part of this process. To allow for better quantitation of the Al and Ti in the samples, the samples with initial results above 200 ppm in Al or Ti were re-analyzed with an additional online dilution. The Al and Ti data from the second analysis is displayed above for all samples with results above 200 ppm.

Problem to be Solved

There is an industry need to reduce metal impurities from fluid silicon compounds such as chlorosilane mixtures or DPR containing high (500 ppm or more) levels of a metal impurity (e.g., an impurity containing aluminum) to a level less than 50 ppm, alternatively less than 10 ppm. Furthermore, there is an industry need to remove titanium and/or aluminum impurities from such fluid silicon compounds.

INDUSTRIAL APPLICABILITY

The examples and comparative examples above show that treating TCS DPR with carbon and amine was an effective method for reducing content of impurities containing metals (Al and/or Ti) to enable further use in a range of industrial applications. Reduction of such impurity content may be necessary in some instances to avoid poisoning of catalysts used in downstream process steps.

Furthermore, in the downstream process steps, the process described herein may provide the further benefit that residual tertiary amine in the purified fluid silicon compound of step 2) may act as a catalyst or co-catalyst for subsequent reactions of the halosilanes and/or the high boiling components to make organosilanes.

DEFINITIONS AND USAGE OF TERMS

All amounts, ratios, and percentages herein are by weight, unless otherwise indicated. The SUMMARY and ABSTRACT are hereby incorporated by reference. The terms "comprising" or "comprise" are used herein in their broadest sense to mean and encompass the notions of "including," "include," "consist(ing) essentially of," and "consist(ing) of". The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The abbreviations used herein have the definitions in Table 9.

TABLE 9

Abbreviations

| Abbreviation | Definition |
|---|---|
| ° C. | degrees Celsius |
| DPR | direct process residue |

TABLE 9-continued

Abbreviations

| Abbreviation | Definition |
|---|---|
| ICP-OES | Inductively Coupled Plasma-Optical Emission Spectrometer |
| MCS DPR | direct process residue produced by the direct process for manufacturing methylchlorosilanes, including dimethyldichlorosilane |
| ND | non-detectable, refers to a value of none or so low it is not detectable using the test method specified |
| RT | room temperature of 20° C. to 25° C. |
| TCS DPR | direct process residue produced by the direct process for manufacturing inorganic chlorosilanes, such as trichlorosilane (HSiCl$_3$) |

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range of "1 to 18" may be further delineated into a lower third, i.e., 1 to 6, a middle third, i.e., 7 to 12, and an upper third, i.e., from 13 to 18, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

Embodiments of the Invention

In a first embodiment, a process for purifying a fluid silicon compound comprises:
1) combining
99.5 weight % to 99.75 weight % of a mixture comprising
i) a fluid silicon compound and
ii) an impurity comprising a metal, where the impurity is present in an amount sufficient to provide at least 1,000 ppm of the metal based on weight of the mixture, and
0.25 weight % to 0.5 weight % of a tertiary amine; thereby forming a product comprising i) the fluid silicon compound and iii) an amine-metal complex; and 2) combining
<98 weight % of the product formed in step 1), and
>2 weight % of a bituminous coal based activated carbon; thereby adsorbing the amine-metal complex with the activated carbon and preparing a purified fluid silicon compound.

In a second embodiment, the process of the first embodiment further comprises drying the activated carbon before mixing the product formed in step 1) and the activated carbon in step 2).

In a third embodiment, the process of the first embodiment or the second embodiment further comprising filtering the product formed in step 1) before performing step 2).

In a fourth embodiment, in the process of any one of the preceding embodiments, the mixture in step 1) is direct process residue.

In a fifth embodiment, the process of the fourth embodiment further comprises removing particulate from the direct process residue before step 1).

In a sixth embodiment, the process of the fourth embodiment or the fifth embodiment further comprises removing volatiles from the direct process residue before step 1).

In a seventh embodiment, in the process of any one of the fourth to sixth embodiments, the direct process residue is trichlorosilane direct process residue.

In an eighth embodiment, in the process of the seventh embodiment, the trichlorosilane direct process residue comprises a silane of formula $H_aSiCl_{(4-a)}$ where subscript a is 0 to 4, and a polysilane of formula

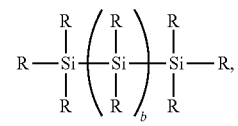

where each R is independently selected from H and Cl, and subscript b is 0 to 6?, with the proviso that at least 2 instances of R per molecule are Cl.

In a ninth embodiment, in the process of any one of the fourth to sixth embodiments, the direct process residue is methylchlorosilane direct process residue.

In a tenth embodiment, in the process of the ninth embodiment, the methylchlorosilane direct process residue comprises a silane of formula $(CH_3)_cSiCl_{(4-c)}$ where subscript c is 0 to 4 and a polysilane of formula

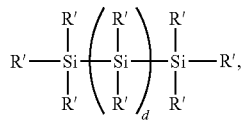

where each R' is independently selected from H, methyl, and Cl, and subscript d is 0 to 6, with the proviso that at least 2 instances of R' per molecule are Cl.

In an eleventh embodiment, in the process of any one of the first to third embodiments, the fluid silicon compound comprises a halosilane monomer of formula $(CH_3)_cSiCl_{(4-c)}$ where subscript c is 1 to 3.

In a twelfth embodiment, in the process of any one of the preceding embodiments, the impurity is selected from the group consisting of aluminum, titanium, a compound of aluminum, a compound of titanium, or a combination of any two or more thereof.

In a thirteenth embodiment, in the process of the twelfth embodiment, the mixture in step 1) contains at least 700 ppm by weight of aluminum and at least 900 ppm by weight of titanium.

In a fourteenth embodiment, in the process of any one of the preceding embodiments, the mixture in step 1) contains up to 4000 ppm of the impurity.

In a fifteenth embodiment, in the process of any one of the preceding embodiments, B) the tertiary amine is a trialkyl amine of formula NR"$_3$, where each R" is an independently selected alkyl group of 2 to 16 carbon atoms.

In a sixteenth embodiment, in the process of the fifteenth embodiment, the trialkyl amine is triethylamine.

In a seventeenth embodiment, in the process of one of the preceding embodiments, the activated carbon is selected from the group consisting of CPG-LF and PWA grades available from Calgon Carbon Corporation.

In an eighteenth embodiment, in the process of any one of the preceding embodiments, step 2) is performed at a temperature of –30° C. to 300° C.

In a nineteenth embodiment, in the process of any one of the preceding embodiments, step 2) is performed by mixing the product of step 1) and the activated carbon in a batch vessel.

In a twentieth embodiment, in the process of any one of the first to eighteenth embodiments, step 2) is performed continuously or semi-continuously using a fixed bed contactor, wherein the activated carbon is packed in the contactor and the product of step 1) is passed through the contactor.

In a twenty-first embodiment, the process of any one of the preceding embodiments further comprising: 3) separating the activated carbon and the fluid silicon compound after step 2).

In a twenty-second embodiment, the process of the twenty-first embodiment is performed by sedimentation, centrifugation and/or filtration.

In a twenty-second embodiment, in the process of any one of the preceding embodiments, purified fluid silicon compound contains <10 ppm titanium, <10 ppm aluminum, or both.

In a twenty-fourth embodiment, in the process of any one of the preceding embodiments, the purified fluid silicon compound contains excess tertiary amine.

In a twenty-fifth embodiment, the process of the twenty-fourth embodiment further comprises removing all or a portion of the excess tertiary amine from the purified fluid silicon compound.

The invention claimed is:

1. A process for purifying a fluid silicon compound comprising:
1) combining
99.5 weight % to 99.75 weight % of a mixture comprising
   i) a fluid silicon compound comprising a halosilane monomer, and
   ii) an impurity comprising a metal selected from the group consisting of aluminum, titanium, a compound of aluminum, a compound of titanium, or a combination of any two or more thereof, where the impurity is present in an amount sufficient to provide at least 500 ppm of the metal based on weight of the mixture, and
0.25 weight % to 0.5 weight % of a tertiary amine;
thereby forming a product comprising i) the fluid silicon compound and iii) an amine-metal complex; and
2) combining
92 weight % to 98 weight % of the product formed in step 1), and
2 weight % to 8 weight % of an activated carbon; thereby adsorbing the amine-metal complex with the activated carbon and preparing the purified fluid silicon compound.

2. The process of claim 1, where the mixture in step 1) is direct process residue.

3. The process of claim 2, where the direct process residue is trichlorosilane direct process residue.

4. The process of claim 3, where the trichlorosilane direct process residue comprises a silane of formula H$_a$SiCl$_{(4-a)}$ where subscript a is 0 to 4 as the halosilane monomer, and a polysilane of formula

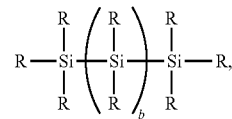

where each R is independently selected from H and Cl, and subscript b is 0 to 6, with the proviso that at least 2 instances of R per molecule are Cl.

5. The process of claim 2, where the direct process residue is methylchlorosilane direct process residue.

6. The process of claim 5, where the methylchlorosilane direct process residue comprises a silane of formula (CH$_3$)$_c$SiCl$_{(4-c)}$ where subscript c is 0 to 4 as the halosilane monomer, and a polysilane of formula

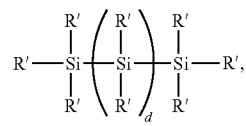

where each R' is independently selected from H, methyl, and Cl, and subscript d is 0 to 6, with the proviso that at least 2 instances of R' per molecule are Cl.

7. The process of claim 1, where i) the fluid silicon compound comprises a halosilane monomer of formula (CH$_3$)$_c$SiCl$_{(4-c)}$ where subscript c is 1 to 3.

8. The process of claim 1, where the mixture in step 1) contains at least 700 ppm by weight of aluminum and at least 900 ppm by weight of titanium.

9. The process of claim 1, where the mixture in step 1) contains up to 4000 ppm of the impurity.

10. The process of claim 1, where B) the tertiary amine is a trialkyl amine of formula NR"$_3$, where each R" is an independently selected alkyl group of 2 to 16 carbon atoms.

11. The process of claim 10, where the trialkyl amine is triethylamine.

12. The process of claim 1, where the activated carbon is bituminous coal based.

13. The process of claim 1, further comprising: 3) separating the activated carbon and the fluid silicon compound after step 2).

* * * * *